United States Patent
Yamauchi et al.

(10) Patent No.: US 9,641,728 B2
(45) Date of Patent: May 2, 2017

(54) IMAGE DATA PROCESSING APPARATUS

(71) Applicant: FUJI XEROX CO., LTD., Tokyo (JP)

(72) Inventors: Kaoru Yamauchi, Kanagawa (JP); Masahiko Kubo, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/606,299

(22) Filed: Jan. 27, 2015

(65) Prior Publication Data
US 2016/0088195 A1  Mar. 24, 2016

(30) Foreign Application Priority Data

Sep. 18, 2014 (JP) .................................. 2014-189880

(51) Int. Cl.
*H04N 1/46* (2006.01)
*H04N 1/60* (2006.01)
*G06K 9/00* (2006.01)
*G06K 15/02* (2006.01)
*H04N 1/54* (2006.01)

(52) U.S. Cl.
CPC ....... *H04N 1/6097* (2013.01); *G06K 15/1878* (2013.01); *H04N 1/54* (2013.01)

(58) Field of Classification Search
None
See application file for complete search history.

(56) References Cited

U.S. PATENT DOCUMENTS

| 4,825,246 | A | * | 4/1989 | Fukuchi | H04N 1/486 347/119 |
| 5,189,528 | A | * | 2/1993 | Takashima | H04N 1/4076 348/E5.081 |
| 5,194,945 | A | * | 3/1993 | Kadowaki | H04N 1/62 358/520 |
| 5,696,595 | A | * | 12/1997 | Yamanishi | G01N 21/5911 358/3.23 |
| 5,848,183 | A | * | 12/1998 | Farrell | G06T 7/0081 382/168 |
| 5,881,166 | A | * | 3/1999 | Farrell | H04N 1/40 382/168 |
| 6,025,922 | A | * | 2/2000 | Marsden | G06K 15/02 358/1.1 |

(Continued)

FOREIGN PATENT DOCUMENTS

JP    2009-055600 A    3/2009

*Primary Examiner* — Madelein Nguyen
(74) *Attorney, Agent, or Firm* — Oliff PLC

(57) ABSTRACT

An image data processing apparatus includes a white-colorant-amount specifying unit that specifies an amount of a white colorant used by an image forming apparatus to form an image having a unit area, the image forming apparatus forming an image on a recording medium by using the white colorant and at least one process-color colorant; and a process-color-colorant-total-amount adjusting unit that adjusts a total amount of the at least one process-color colorant used by the image forming apparatus to form the image having a unit area. The process-color-colorant-total-amount-adjusting unit adjusts the total amount of the at least one process-color colorant so that a sum of the amount of the white colorant and the total amount of the at least one process-color colorant used to form the image having a unit area is constant.

18 Claims, 4 Drawing Sheets

(56) References Cited

U.S. PATENT DOCUMENTS

| | | | | |
|---|---|---|---|---|
| 6,043,900 A * | 3/2000 | Feng | G06T 5/009 | 358/1.9 |
| 6,222,642 B1 * | 4/2001 | Farrell | G06K 9/38 | 358/1.9 |
| 6,498,912 B1 * | 12/2002 | Leni | G03G 21/02 | 399/1 |
| 6,499,829 B1 * | 12/2002 | Tabata | H04N 1/6025 | 347/15 |
| 6,739,767 B2 * | 5/2004 | Ikeda | H04N 1/6086 | 348/223.1 |
| 7,152,942 B2 * | 12/2006 | Walmsley | B41J 2/04505 | 347/15 |
| 7,574,040 B2 * | 8/2009 | Ito | G01J 3/46 | 382/162 |
| 8,194,094 B2 * | 6/2012 | Sakaigawa | G09G 3/2003 | 345/204 |
| 9,213,924 B1 * | 12/2015 | Kuo | G06K 15/14 | |
| 2002/0126894 A1 * | 9/2002 | Segawa | G06K 7/12 | 382/176 |
| 2004/0047007 A1 * | 3/2004 | Kanno | H04N 1/40056 | 358/474 |
| 2004/0100516 A1 * | 5/2004 | Nagoshi | B41J 2/2056 | 347/14 |
| 2004/0131403 A1 * | 7/2004 | Nakamura | G03G 8/00 | 399/341 |
| 2005/0214006 A1 * | 9/2005 | Bessho | G03G 15/5025 | 399/49 |
| 2006/0204886 A1 * | 9/2006 | Nakamura | B41M 5/395 | 430/270.1 |
| 2006/0245015 A1 * | 11/2006 | Ikeno | H04N 1/00002 | 358/518 |
| 2007/0014973 A1 * | 1/2007 | Koda | B41M 5/508 | 428/195.1 |
| 2008/0088860 A1 * | 4/2008 | Yoshida | B41M 3/144 | 358/1.8 |
| 2008/0278433 A1 * | 11/2008 | Lee | G09G 3/344 | 345/107 |
| 2009/0033961 A1 * | 2/2009 | Tamagawa | H04N 1/6022 | 358/1.9 |
| 2009/0040207 A1 * | 2/2009 | Park | G09G 3/2003 | 345/211 |
| 2009/0046307 A1 * | 2/2009 | Kwak | G09G 5/02 | 358/1.9 |
| 2009/0147320 A1 * | 6/2009 | Lee | H04N 1/00002 | 358/475 |
| 2010/0079819 A1 * | 4/2010 | Ouchi | B41J 2/2142 | 358/3.26 |
| 2011/0102488 A1 * | 5/2011 | Usuda | B41J 2/2114 | 347/14 |
| 2011/0141174 A1 * | 6/2011 | Usuda | B41J 2/2114 | 347/12 |
| 2011/0149311 A1 * | 6/2011 | Mestha | H04N 1/6033 | 358/1.9 |
| 2011/0149357 A1 * | 6/2011 | Utsunomiya | H04N 1/4097 | 358/475 |
| 2011/0183247 A1 * | 7/2011 | Kadokura | G03G 9/0827 | 430/105 |
| 2011/0205568 A1 * | 8/2011 | Moalem | G03G 15/0131 | 358/1.9 |
| 2011/0318510 A1 * | 12/2011 | Seguchi | B41M 5/506 | 428/32.33 |
| 2012/0156604 A1 * | 6/2012 | Fukatsu | G03G 13/20 | 430/105 |
| 2012/0162672 A1 * | 6/2012 | Mantell | H04N 1/6016 | 358/1.9 |
| 2012/0162680 A1 * | 6/2012 | Mori | H04N 1/33315 | 358/1.13 |
| 2013/0155160 A1 * | 6/2013 | Shiono | C09D 11/322 | 347/100 |
| 2013/0208321 A1 * | 8/2013 | Suzuki | G06K 15/1881 | 358/3.06 |
| 2014/0198348 A1 * | 7/2014 | Yoshida | H04N 1/4453 | 358/3.28 |
| 2014/0204405 A1 * | 7/2014 | Robles Flores | G06K 15/4065 | 358/1.14 |
| 2014/0287206 A1 * | 9/2014 | Sasada | B41J 2/01 | 428/207 |
| 2015/0029518 A1 * | 1/2015 | Tashiro | G03G 15/5025 | 358/1.1 |
| 2016/0086060 A1 * | 3/2016 | Kubo | G06K 15/129 | 399/38 |

* cited by examiner

IMAGE DATA PROCESSING APPARATUS

CROSS-REFERENCE TO RELATED APPLICATIONS

This application is based on and claims priority under 35 USC 119 from Japanese Patent Application No. 2014-189880 filed Sep. 18, 2014.

BACKGROUND

Technical Field

The present invention relates to an image data processing apparatus.

SUMMARY

According to an aspect of the present invention, an image data processing apparatus includes a white-colorant-amount specifying unit that specifies an amount of a white colorant used by an image forming apparatus to form an image having a unit area, the white colorant including a white pigment, the image forming apparatus forming an image on a recording medium by using the white colorant and at least one process-color colorant including a process-color pigment that is not a white pigment; and a process-color-colorant-total-amount adjusting unit that adjusts a total amount of the at least one process-color colorant used by the image forming apparatus to form the image having a unit area. The process-color-colorant-total-amount-adjusting unit adjusts the total amount of the at least one process-color colorant so that a sum of the amount of the white colorant and the total amount of the at least one process-color colorant used to form the image having a unit area is constant.

In the present specification, the term "process color" refers to one of basic colors used to form an image. Typically, the basic colors are yellow, magenta, and cyan; or yellow, magenta, cyan, and black. However, the basic colors may include one or more colors different from these.

BRIEF DESCRIPTION OF THE DRAWINGS

An exemplary embodiment of the present invention will be described in detail based on the following figure, wherein.

DETAILED DESCRIPTION

Hereinafter, an exemplary embodiment of the present invention will be described with reference to the drawings.

Figure 1:
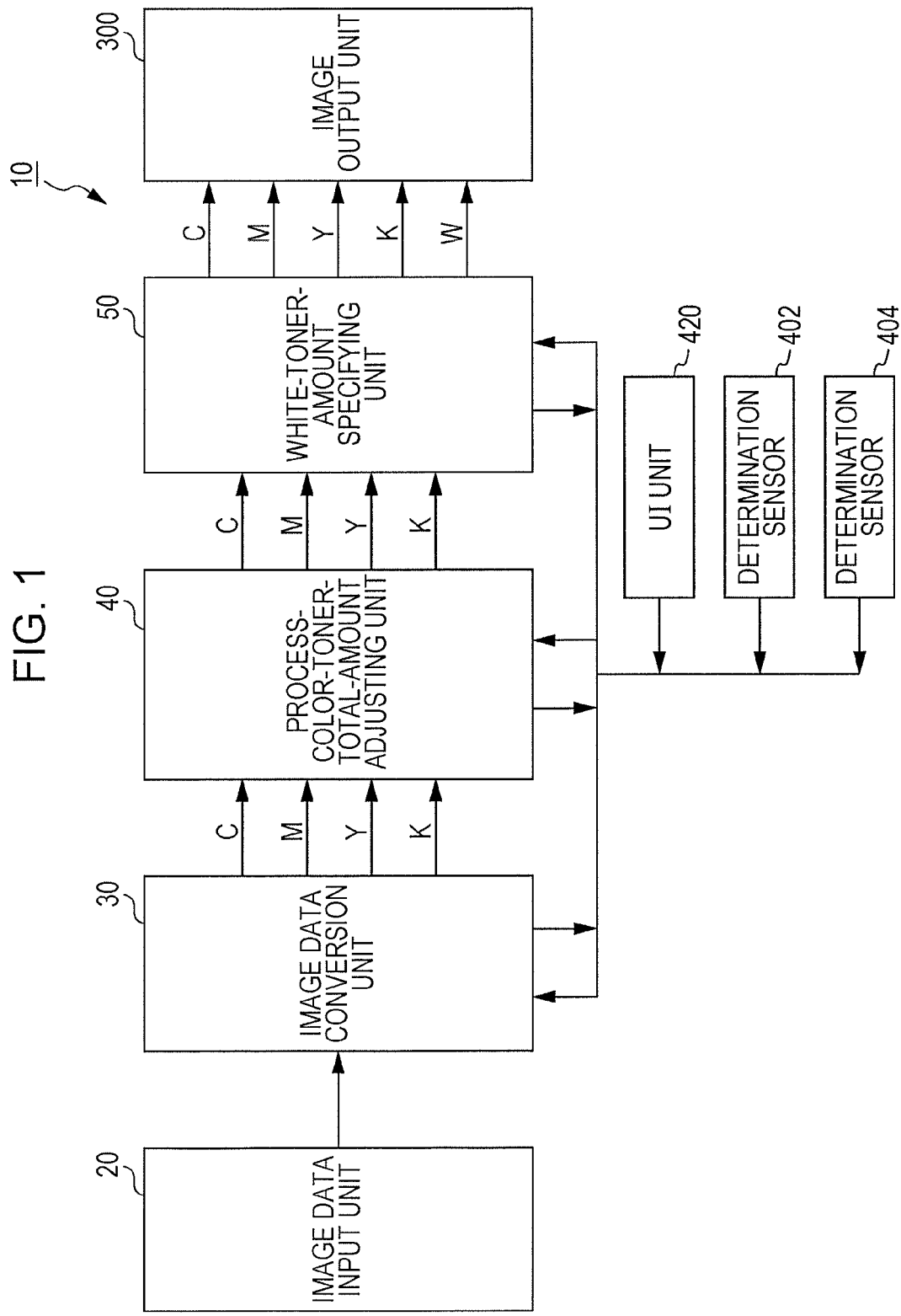
FIG. 1 is a block diagram of an image forming apparatus according to the exemplary embodiment of the present invention.

FIG. 1 is a block diagram of an image forming apparatus 10 according to the exemplary embodiment of the present invention.

Figure 2:
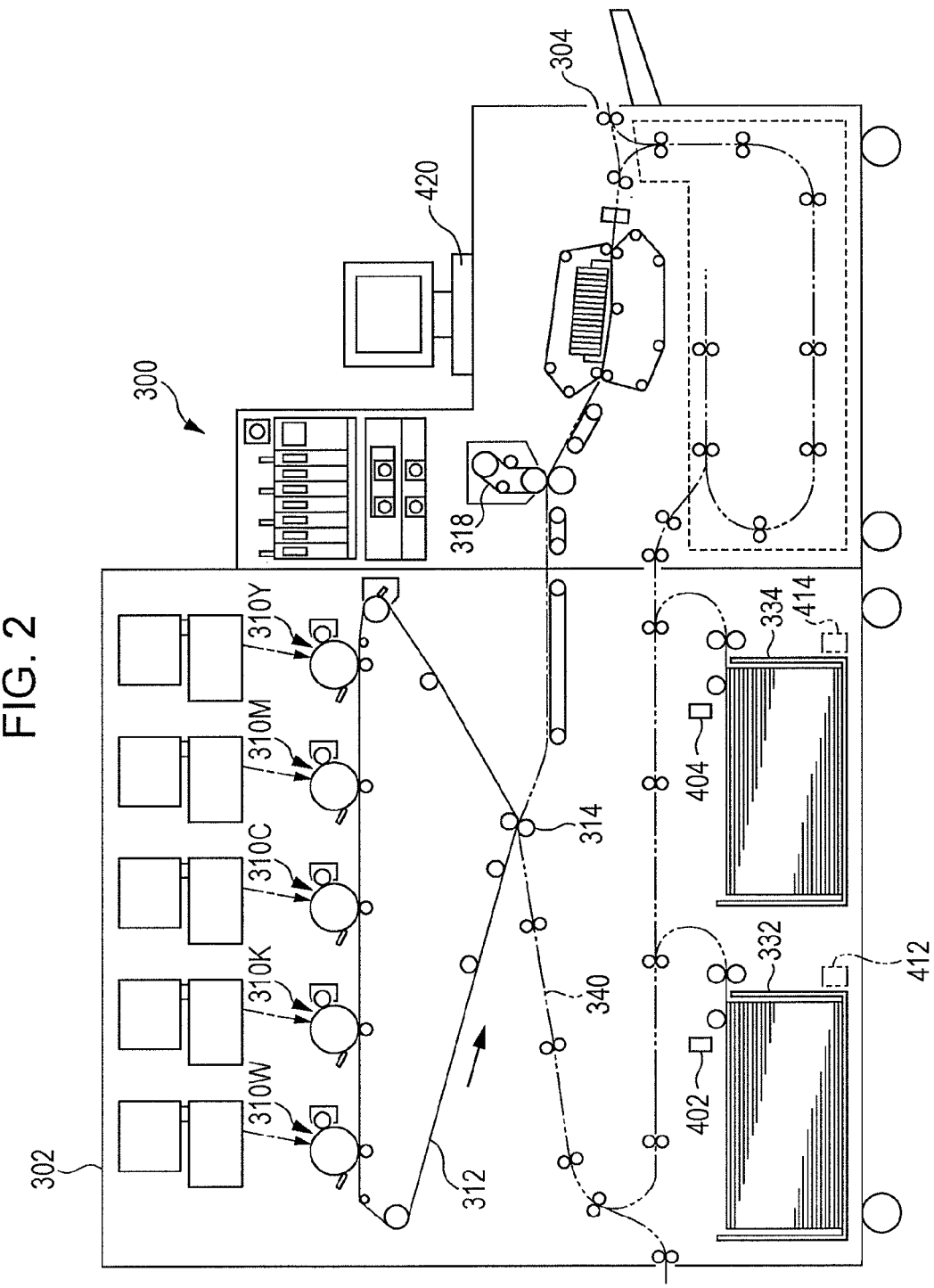
FIG. 2 is a cross-sectional view of an image output unit of the image forming apparatus illustrated in FIG. 1.

FIG. 2 is a cross-sectional view of an image output unit 300 of the image forming apparatus 10. The image output unit 300 forms an image on a recording medium by using a white toner, which is an example of a white colorant including a white pigment; and a cyan toner, a magenta toner, a yellow toner, and a black toner, which are examples of a process-color colorant including a pigment that is not a white pigment. Examples of a recording medium include an opaque sheet, such as a black sheet or a color sheet, and a transparent resin film.

As illustrated in FIG. 2, the image output unit 300 includes an image output unit body 302, a toner image forming unit 310Y, a toner image forming unit 310M, a toner image forming unit 310C, a toner image forming unit 310K, and a toner image forming unit 310W. The toner image forming units 310Y, 310M, 310C, 310K, and 310W, which are disposed in the image output unit body 302, respectively form a yellow toner image, a magenta toner image, a cyan toner image, a black toner image, and a white toner image. It is not necessary that the image output unit 300 include all of the toner image forming units 310Y, 310M, 310C, 310K, and 310W. Alternatively, the image output unit 300 may include the image forming unit 310W and at least one of the toner image forming units 310Y, 310M, 310C, and 310K.

The image output unit 300 further includes an intermediate transfer member 312. The intermediate transfer member 312 is an endless-belt-like member that rotates in the direction indicated by an arrow shown in FIG. 2. A yellow toner image, a magenta toner image, a cyan toner image, and a black toner image are respectively transferred from the toner image forming units 310Y, 310M, 310C, and 310K to the intermediate transfer member 312. Lastly, a white toner image is transferred from the toner image forming unit 310W to the intermediate transfer member 312.

The image output unit 300 further includes a second-transfer device 314. The second-transfer device 314 transfers the toner images, which have been transferred to the intermediate transfer member 312, to a recording medium. At this time, the white toner image, which has been lastly transferred to the intermediate transfer member 312, is disposed at a position nearest to a surface of the recording medium; and the black toner image, the cyan toner image, the magenta toner image, and the yellow toner image are superposed on the white toner image.

The image output unit 300 further includes a fixing unit 318. The fixing unit 318 fixes the toner images, which have been transferred to the recording medium, to the recording medium by using, for example, heat and pressure. The recording medium, to which the fixing unit 318 has fixed the toner images, is output to the outside of the image output unit body 302 through an output slot 304.

The image output unit 300 further includes a tray 332 for holding recording media and a tray 334 for holding recording media. The trays 332 and 334 are removable from the image output unit body 302 so that trays (not shown) that are different from the trays 332 and 334 may be mounted in the image output unit body 302. The tray 334 and the tray 332 are capable of holding recording media of types that are different from each other. For example, the tray 332 may hold opaque black sheets as recording media, and the tray 334 may hold recording media of a different type, such as transparent resin films.

A transport path 340 for transporting a recording medium is formed in the image output unit body 302. The transport path 340 transports a recording medium from one of the trays 332 and 334 to the second-transfer device 314, to the fixing unit 318, and to the output slot 304.

If the image output unit 300, structured as described above, forms an image on a recording medium that is not white and an image on a white recording medium by using the same amounts of yellow, magenta, cyan, and black toners, the color of the image formed on the recording medium that is not white does not look the same as that of the image formed on the white recording medium. This is because, while a surface of a white recording medium reflects light, a surface of, for example, a black recording medium absorbs a certain amount of light. Therefore, the image output unit 300 forms a white toner layer as the lowermost layer of the toner images (nearest to a recording medium) to cover a colored surface of the recording medium so that the recording medium reflects light as the white recording medium does. The image output unit 300 forms an image in such a way that yellow, magenta, cyan, and black toners are located on the white toner layer, thereby improving color reproduction of image data.

The image output unit 300, structured as described above, is capable of using a limited amount of toner in order to form an image having a unit area, such as an area corresponding to a pixel. If the maximum amount of each of a white toner, a black toner, a cyan toner, a magenta toner, and a yellow toner that the image output unit 300 is capable of transferring to a unit area of a recording medium is defined as 100%, the total amount of toner that the image output unit 300 is capable of using in order to form an image having a unit area is limited to, for example, 300% or less. Such a limitation occurs due mainly to the second-transfer device 314 and the fixing unit 318. To be specific, such a limitation on the total amount of toner that is usable for forming an image having a unit area occurs because, if the total amount of toner became 300% or more, it would be difficult for the second-transfer device 314 to transfer toner images from the intermediate transfer member 312 to a recording medium, and it would be difficult for the fixing unit 318 to fix the toner images to a recording medium.

It is not necessary that the image output unit 300 transfer a white toner image, a black toner image, a cyan toner image, a magenta toner image, and a yellow toner image to the intermediate transfer member 312 and then transfer the toner images from the intermediate transfer member 312 to a recording medium. Alternatively, the image output unit 300 may be configured to directly transfer a white toner image, a black toner image, a cyan toner image, a magenta toner image, and a yellow toner image to a recording medium. In this case, the toner image forming unit 310Y, the toner image forming unit 310M, the toner image forming unit 310C, the toner image forming unit 310K, and the toner image forming unit 310W are arranged so that a white toner image is first transferred to a surface of a recording medium, and a black toner image, a cyan toner image, a magenta toner image, and a yellow toner image are transferred onto the white toner image.

It is not necessary that the image output unit 300 be an electrophotographic system that uses a toner as a colorant as described above. Alternatively, the image output unit 300 may be an inkjet system that uses an ink as a colorant. In this case, the image output unit 300 is configured to first form an image on a recording medium by using a white ink and subsequently form images by using a black ink, a cyan ink, a magenta ink, and a yellow ink on the image output by using the white ink.

As illustrated in FIG. 2, the image forming apparatus 10 includes a determination sensor 402, a determination sensor 404, and a UI (user interface) unit 420, in addition to the image output unit 300. The determination sensor 402 determines the type of recording media in the tray 332. The determination sensor 404 determines the type of recording media in the tray 334. Each of the determination sensor 402 and the determination sensor 404 may be a sensor that measures the light reflectance of a recording medium or a sensor that measures the light transmittance of a recording medium.

It is not necessary that the type of recording media be directly determined. Alternatively, the type of recording media to be stored in the trays may be predetermined. For example, it may be specified that a specific tray holds a specific type of recording media, such that the tray 332 holds black sheets and the tray 334 holds transparent resin films. By doing so, the type of recording media may be determined depending on which of the trays, including the tray 332 and the tray 334, is mounted in the image output unit body 302. In this case, instead of the determination sensor 402 and the determination sensor 404, a tray determination sensor 412 and a tray determination sensor 414 are used to determine which of the trays is mounted.

The UI unit 420 is disposed outside of the image output unit body 302. For example, a keyboard, a touch panel, or the like may be used as the UI unit 420. For example, an operator uses the UI unit 420 to set the amount of white toner used to form an image having a unit area and to give an instruction on the amount of white toner. In this case, the operator selects the instruction on the amount of white toner from, for example, five levels. Alternatively, various types of recording media and the amount of white toner to be used when forming an image having a unit area on each of the types of recording media may be stored as data. In this case, when an operator specifies the type of a recording medium to be used by using the UI unit 420, an instruction on the amount of white toner may be given in accordance with the specified type of the recording medium.

As illustrated in FIG. 1, the image forming apparatus 10 includes an image data input unit 20, an image data conversion unit 30, a process-color-toner-total-amount adjusting unit 40, and a white-toner-amount specifying unit 50, in addition to the image output unit 300, the determination sensor 402, the determination sensor 404, and the UI unit 420, which are described above. Outputs from the determination sensor 402, the determination sensor 402, and the UI unit 420 are input to the image data conversion unit 30, the process-color-toner-total-amount adjusting unit 40, and the white-toner-amount specifying unit 50.

Image data is input to the image data input unit 20 from, for example, the outside. To be specific, image data that is input to the image data input unit 20 is, for example, YMCK four-color bitmap image data that is generated by, for example, interpreting print data described in a page description language or the like, or by converting an RGB image or the like, which has been read by using a scanner or the like, into a device-independent YMCK color space of four basic colors for printing.

The image data conversion unit 30 converts the image data, which has been input to the image data input unit 20, into a device-dependent color toner signal in accordance with the color reproduction characteristic of the image output unit 300. A cyan component, a magenta component, a yellow component, and a black component of the color toner signal, which has been generated by conversion, respectively correspond to the densities (the amounts per unit area) of a cyan toner, a magenta toner, a yellow toner, and a black toner. At this time, the image data conversion unit 30 converts the input image data into a color toner signal so that the total amount of process-color (cyan, magenta, yellow, and black) toners used to form an image having a unit area has a value adjusted by the process-color-toner-total-amount adjusting unit 40.

The process-color-toner-total-amount adjusting unit 40 adjusts the total amount of process-color toners used to form an image having a unit area, that is, the sum of the amount of cyan toner, the amount of magenta toner, the amount of yellow toner, and the amount of black toner. At this time, the process-color-toner-total-amount adjusting unit 40 adjusts the total amount of process-color toners so that the sum of the total amount of the process-color toners used to form an image having a unit area and the amount of white toner used to form the image having a unit area is constant.

The sum of the total amount of process-color toners and the amount white toner, which is made to be constant, is set in such a range that the image output unit 300 is capable of outputting an image. To be specific, when the maximum amount of each of a white toner, a black toner, a cyan toner, a magenta toner, and a yellow toner that the image output unit 300 is capable of transferring to a unit area of a recording medium is defined as 100%, the total amount is set at 300%. Therefore, as described above, transfer failure in the second-transfer device 314 and fixing failure in the fixing unit 318, which might occur if the sum of the total amount of process-color toners and the amount of white toner were more than 300%, do not occur.

The white-toner-amount specifying unit 50 specifies the amount of white toner used to form an image having a unit area in accordance with the type of recording medium determined by the determination sensor 402 or the determination sensor 404 or the type of recording medium input from the UI unit 420. As described above, a white toner is used to cover a colored surface of a recording medium in order to improve the color reproducibility. The optimum amount of white toner for covering the colored surface differs depending on the type of a recording medium, such as whether the recording medium is opaque or transparent, the color of the recording medium, or the like. Therefore, with the image forming apparatus 10, the white-toner-amount specifying unit 50 adjusts the amount of white toner used to form an image having a unit area in accordance with the type of the recording medium so that the amount of white toner has the optimum value.

To be specific, the white-toner-amount specifying unit 50 specifies the amount of white toner used to form an image having a unit area in such a way that the amount of white toner increases as the light reflectance of a surface of a recording medium decreases. Moreover, the white-toner-amount specifying unit 50 specifies the amount of white toner used to form an image having a unit area in such a way that the amount of white toner increases as the light transmittance of a surface of a recording medium decreases.

Figure 3:
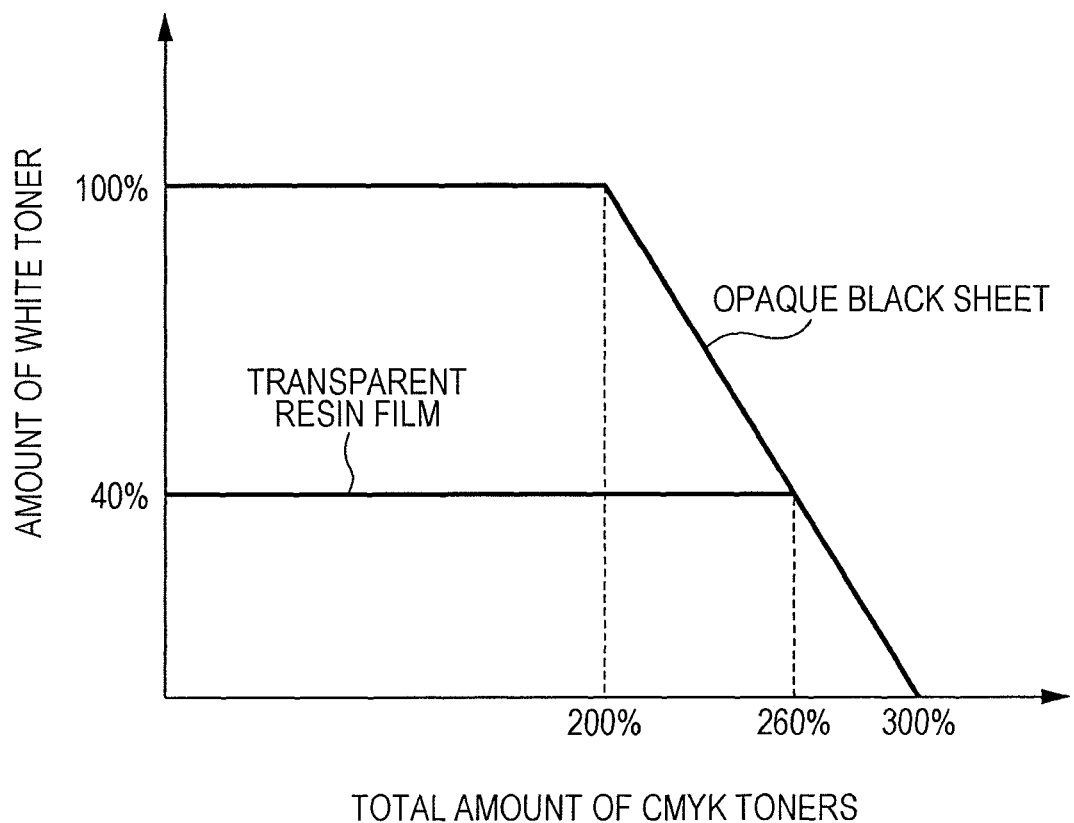
FIG. 3 is a diagram illustrating a function performed by a white-toner-amount specifying unit and a process-color-toner-total-amount adjusting unit of the image forming apparatus illustrated in FIG. 1.

FIG. 3 is a diagram illustrating a function performed by the white-toner-amount specifying unit 50 and the process-color-toner-total-amount adjusting unit 40. With the image forming apparatus 10, the sum of the total amount of process-color toners and the amount of white toner used to form an image having a unit area is set at 300% as described above. In a case where an opaque black sheet is used as a recording medium, the amount of white toner used to cover a surface of a recording medium is set at 100%. In this case, the total amount of process-color toners (the total amount of yellow toner, magenta toner, cyan toner, and black toner) is adjusted at 200% as shown in FIG. 3.

With the image forming apparatus 10, in a case where a transparent resin film is used as a recording medium, the amount of white toner used to cover a surface of the recording medium is 40%. In this case, the total amount of process-color toners is 260%.

Figure 4A:
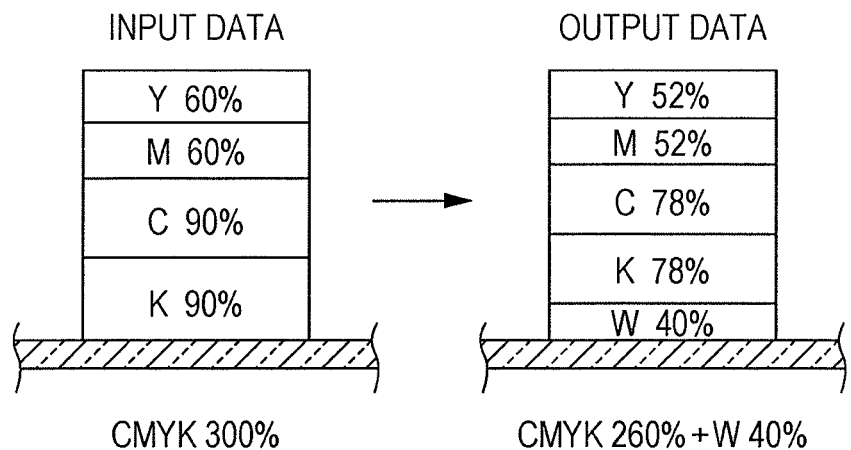
FIG. 4A illustrates input data that is input to an image data input unit of the image forming apparatus illustrated in FIG. 1 and output data that is output to the image output unit in a case where a transparent resin film is used as a recording medium.

FIG. 4A illustrates input data that is input to the image data input unit 20 and output data that is output to the image output unit 300 in a case where a transparent resin film is used as a recording medium.

Figure 4B:
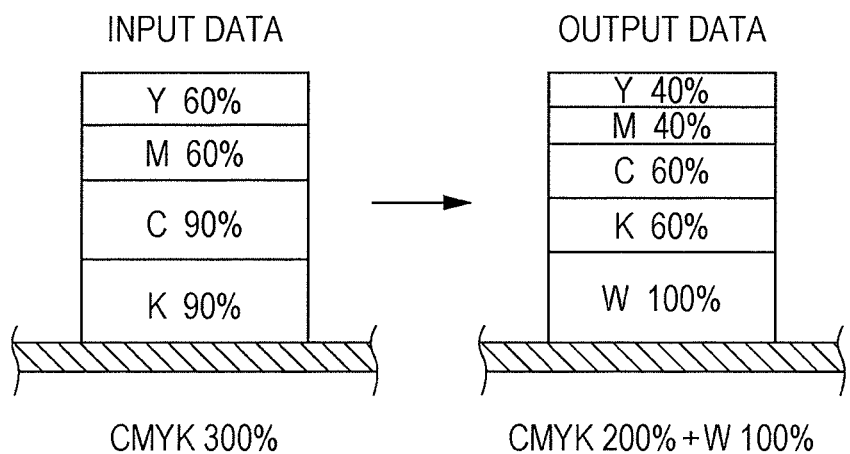
FIG. 4B illustrates input data that is input to the image data input unit and output data that is output to the image output unit in a case where an opaque black sheet is used as a recording medium.

FIG. 4B illustrates input data that is input to the image data input unit 20 and output data that is output to the image output unit 300 in a case where an opaque black sheet is used as a recording medium.

FIGS. 4A and 4B both illustrate a case where image data corresponding to a toner amount of 300%, including yellow 60%, magenta 60%, cyan 90%, and black 90%, is input to the image data input unit 20. In the case where a transparent resin film is used as a recording medium, which is illustrated in FIG. 4A, the amount of white toner in output data is 40% as described above, and the total amount of process-color toners is 260%, which is 300%−40% (see FIG. 3). With the image forming apparatus 10, the amount of yellow toner, the amount of magenta toner, the amount of cyan toner, and the amount of black toner in output data are converted so that the ratio of yellow toner, magenta toner, cyan toner, and black toner to each other becomes the same as that of the input data. Thus, conversion is performed so that the amount of yellow toner becomes 52%, the amount of magenta toner becomes 52%, the amount of cyan toner becomes 78%, and the amount of black toner becomes 78%.

In the case where an opaque black sheet is used as a recording medium, which is illustrated in FIG. 4B, the amount of white toner in output data is 100% as described above, and the total amount of process-color toners is 200%, which is 300%−100% (see FIG. 3). The amount of yellow toner, the amount of magenta toner, the amount of cyan toner, and the amount of black toner in output data are converted so that the ratio of yellow toner, magenta toner, cyan toner, and black toner to each other becomes the same as that of the input data. Thus, conversion is performed so that the amount of yellow toner becomes 40%, the amount of magenta toner becomes 40%, the amount of cyan toner becomes 60%, and the amount of black toner becomes 60%.

It is not necessary that the amount of yellow toner, the amount of magenta toner, the amount of cyan toner, and the amount of black toner in output data be converted so that the ratio of yellow toner, magenta toner, cyan toner, and black toner to each other become the same as that of the input data. Alternatively, the amount of black toner may be the same before and after conversion; and the amount of yellow toner, the amount of magenta toner, and the amount of cyan toner in output data may be converted so that the ratio of yellow toner, magenta toner, and cyan toner to each other become the same as that of the input data.

As described above, with the image forming apparatus 10, the amount of white toner is first set in accordance with the type of recording medium so as to be at the optimum value for covering a surface of a recording medium, and the amount of process-color toner is subsequently set so that the sum of the amount of white toner and the total amount of process-color toners (yellow toner, magenta toner, cyan toner, and black toner) is constant.

As described above, the image forming apparatus 10 includes the image data input unit 20, the image data conversion unit 30, the process-color-toner-total-amount adjusting unit 40, the white-toner-amount specifying unit 50, and the image output unit 300. Alternatively, the image output unit 300 may be an independent image forming apparatus, and an image data processing apparatus, such as a controller, may include the image data input unit 20, the image data conversion unit 30, the process-color-toner-total-amount adjusting unit 40, and the white-toner-amount specifying unit 50.

As heretofore described, the present invention may be used for an image forming apparatus, such as a copier, a facsimile, or a printer; and for an image data processing apparatus for processing image data used in such an image forming apparatus.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image data processing apparatus comprising:
    a controller configured to act as:
        a white-colorant-amount specifying unit that specifies an amount of a white colorant used by an image forming apparatus to form an image having a unit area in such a way that the amount of white colorant increases as the light reflectance of a surface of a recording medium decreases or in such a way that the amount of white colorant increases as the light transmittance of a surface of a recording medium decreases, the white colorant including a white pigment, the image forming apparatus forming an image on a recording medium by using the white colorant and at least one process-color colorant including a process-color pigment that is not a white pigment; and
        a process-color-colorant-total-amount adjusting unit that adjusts a total amount of the at least one process-color colorant used by the image forming apparatus to form the image having a unit area,
            wherein the process-color-colorant-total-amount-adjusting unit adjusts the total amount of the at least one process-color colorant so that a sum of the amount of the white colorant and the total amount of the at least one process-color colorant used to form the image having a unit area is constant.

2. The image data processing apparatus according to claim 1,
    wherein the white-colorant-amount specifying unit specifies the amount of the white colorant in accordance with a type of the recording medium.

3. The image data processing apparatus according to claim 2,
    wherein the white-colorant-amount specifying unit specifies the amount of the white colorant in accordance with an instruction from an operator.

4. The image data processing apparatus according to claim 3, further comprising:
    an image data conversion unit that converts input image data so that the total amount of the at least one process-color colorant used to form the image having a unit area has a value adjusted by the process-color-colorant-total-amount adjusting unit.

5. The image data processing apparatus according to claim 3,
    wherein the process-color-colorant-total-amount adjusting unit adjusts the total amount of the at least one process-color colorant used to form the image having a unit area so that the sum of the amount of the white colorant and the total amount of the at least one process-color colorant used to form the image having a unit area is in a range that the image forming apparatus is capable of forming an image.

6. The image data processing apparatus according to claim 4,
    wherein the process-color-colorant-total-amount adjusting unit adjusts the total amount of the at least one process-color colorant used to form the image having a unit area so that the sum of the amount of the white colorant and the total amount of the at least one process-color colorant used to form the image having a unit area is in a range that the image forming apparatus is capable of forming an image.

7. The image data processing apparatus according to claim 2, further comprising:
    an image data conversion unit that converts input image data so that the total amount of the at least one process-color colorant used to form the image having a unit area has a value adjusted by the process-color-colorant-total-amount adjusting unit.

8. The image data processing apparatus according to claim 7,
    wherein the process-color-colorant-total-amount adjusting unit adjusts the total amount of the at least one process-color colorant used to form the image having a unit area so that the sum of the amount of the white colorant and the total amount of the at least one process-color colorant used to form the image having a unit area is in a range that the image forming apparatus is capable of forming an image.

9. The image data processing apparatus according to claim 2,
    wherein the process-color-colorant-total-amount adjusting unit adjusts the total amount of the at least one process-color colorant used to form the image having a unit area so that the sum of the amount of the white colorant and the total amount of the at least one process-color colorant used to form the image having a unit area is in a range that the image forming apparatus is capable of forming an image.

10. The image data processing apparatus according to claim 1,
    wherein the white-colorant-amount specifying unit specifies the amount of the white colorant in accordance with an instruction from an operator.

11. The image data processing apparatus according to claim 10, further comprising:
    an image data conversion unit that converts input image data so that the total amount of the at least one process-color colorant used to form the image having a unit area has a value adjusted by the process-color-colorant-total-amount adjusting unit.

12. The image data processing apparatus according to claim 11,
    wherein the process-color-colorant-total-amount adjusting unit adjusts the total amount of the at least one process-color colorant used to form the image having a unit area so that the sum of the amount of the white colorant and the total amount of the at least one process-color colorant used to form the image having a unit area is in a range that the image forming apparatus is capable of forming an image.

13. The image data processing apparatus according to claim 10,
wherein the process-color-colorant-total-amount adjusting unit adjusts the total amount of the at least one process-color colorant used to form the image having a unit area so that the sum of the amount of the white colorant and the total amount of the at least one process-color colorant used to form the image having a unit area is in a range that the image forming apparatus is capable of forming an image.

14. The image data processing apparatus according to claim 1, further comprising:
an image data conversion unit that converts input image data so that the total amount of the at least one process-color colorant used to form the image having a unit area has a value adjusted by the process-color-colorant-total-amount adjusting unit.

15. The image data processing apparatus according to claim 14,
wherein the process-color-colorant-total-amount adjusting unit adjusts the total amount of the at least one process-color colorant used to form the image having a unit area so that the sum of the amount of the white colorant and the total amount of the at least one process-color colorant used to form the image having a unit area is in a range that the image forming apparatus is capable of forming an image.

16. The image data processing apparatus according to claim 1,
wherein the process-color-colorant-total-amount adjusting unit adjusts the total amount of the at least one process-color colorant used to form the image having a unit area so that the sum of the amount of the white colorant and the total amount of the at least one process-color colorant used to form the image having a unit area is in a range that the image forming apparatus is capable of forming an image.

17. An image data processing apparatus comprising:
a controller configured to act as:
a white-colorant-amount specifying unit that specifies an amount of a white colorant used by an image forming apparatus to form an image having a unit area in such a way that the amount of white colorant increases as the light reflectance of a surface of a recording medium decreases, the white colorant including a white pigment, the image forming apparatus forming an image on a recording medium by using the white colorant and at least one process-color colorant including a process-color pigment that is not a white pigment,
wherein the white-colorant-amount specifying unit specifies the amount of the white colorant in accordance with a type of the recording medium.

18. An image data processing apparatus comprising:
a controller configured to act as:
a white-colorant-amount specifying unit that specifies an amount of a white colorant used by an image forming apparatus to form an image having a unit area in such a way that the amount of white colorant increases as the light transmittance of a surface of a recording medium decreases, the white colorant including a white pigment, the image forming apparatus forming an image on a recording medium by using the white colorant and at least one process-color colorant including a process-color pigment that is not a white pigment,
wherein the white-colorant-amount specifying unit specifies the amount of the white colorant in accordance with a type of the recording medium.

* * * * *